United States Patent Office 3,183,278
Patented May 11, 1965

3,183,278
PROCESS FOR HYDROGENATING CARBOCYCLIC AROMATIC COMPOUNDS
John J. Koch, Jr., Nutley, N.J., assignor to Engelhard Industries, Inc., Newark, N.J., a corporation of Delaware
No Drawing. Filed Nov. 20, 1962, Ser. No. 239,063
11 Claims. (Cl. 260—667)

This invention relates to a process for the nuclear hydrogenation of carbocyclic aromatic compounds.

This is a continuation-in-part of co-pending application Serial No. 177,977, filed March 27, 1962, which in turn is a divisional application of co-pending application Serial No. 708,371, filed January 13, 1958, now U.S. Patent No. 3,055,084.

Ruthenium catalysts on various carriers have been described heretofore. These catalysts have a specific property of hydrogenating ketone and aldehyde groups under low temperature conditions, a property which is highly important where labile organic compounds are concerned. The ruthenium-containing catalysts are superior to all others in this specific hydrogenating activity; however, ruthenium catalysts have the deficiency of instability of activity for low temperature, atmospheric pressure reactions, and this is particularly true of ruthenium supported on carbon powder, which is the most active catalyst for acetone hydrogenation at room temperature conditions. The loss of activity is erratic and only a partial recovery of activity may be obtained by again reducing the catalyst.

In accordance with the present invention, a new and improved process is provided for effecting the hydrogenation of the nucleus of carbocyclic aromatic compounds catalytically wherein the hydrogenation is effected over a materially longer period than when utilizing catalysts of the prior art, and without premature cessation of the hydrogenation due to loss of activity of the catalyst which occurs using the prior art catalyst. The process involves contacting the carbocyclic aromatic compound, which is an unsubstituted carbocyclic aromatic compound or a carbocyclic aromatic compound having one or more alkyl substituents on the aromatic nucleus, with a supported ruthenium-containing catalyst promoted with another platinum group metal, the ruthenium content of the catalyst being at least about 20 percent by weight of the catalytically active metal content of the catalyst. The process is especially significant and important in treating commercial feeds containing catalyst poisons such as sulfur compounds, inasmuch as the catalyst of this invention has a greatly improved resistance to poisoning.

Ruthenium catalysts promoted with one or more platinum group metals in accordance with the present invention have two important advantages over catalysts consisting of elemental ruthenium alone supported on a carrier, in the hydrogenation of carbocyclic aromatic compounds. First of all, the initial activity of the catalyst is greater, the activity being as much as 100 percent more than a catalyst having the same total metal content in the form of elemental ruthenium, and second, the activity stability for ruthenium catalyst promoted with one or more other metals is satisfactory in all respects.

Exemplary of the carbocyclic aromatic compounds which can be hydrogenated in accordance with the present invention are mononuclear carbocyclic aromatics, for instance benzene, toluene, o-, m- and p-xylenes, durene, cumene, t-butylbenzene, n-hexadecylbenzene, p-cymene, and polynuclear carbocyclic aromatics including naphthalene, α- and β-methyl naphthalenes, anthracene, phenanthrene, diphenyl, diphenylmethane, fluorene and acenaphthene.

The aromatic nucleus of the carbocyclic aromatic compounds is completely or partially hydrogenated in accordance with the present invention to yield valuable hydrogenation product compounds, for instance cyclohexane when benzene is hydrogenated, methyl cyclohexane when toluene is hydrogenated, and tetrahydronaphthalene or decahydronaphthalene when naphthalene is hydrogenated. Dimethyl cyclohexanes are produced when the xylenes are hydrogenated in accordance with this invention, 1,2,4,5-tetramethylcyclohexane is produced when the durene is hydrogenated, isopropylcyclohexane by hydrogenation of the cumene, t-butylcyclohexane by hydrogenation of t-butylbenzene, and 1-methyl-4-isopropyl cyclohexane by hydrogenation of the p-cymene. α-Methylnaphthalene can be partially hydrogenated by this invention to 1-methyl-5,6,7,8-tetrahydro-naphthalene or fully hydrogenated in the nucleus to α-methyldecalin, and β-methylnaphthalene can be partially hydrogenated to 2-methyl-5,6,7,8-tetrahydronaphthalene or 2-methyl-1,2,3,4-tetrahydronaphthalene, or fully hydrogenated to β-methyldecalin. Diphenyl can be hydrogenated to cyclohexylbenzene or dicyclohexyl, diphenylmethane can be hydrogenated to phenylcyclohexyl-methane or dicyclohexylmethane, fluorene to 1,2,3,4-tetrahydrofluorene or to dodecahydrofluorene, n-hexadecylbenzene to n-hexadecylcyclohexane, anthracene to perhydroanthracene or to an anthracene partially hydrogenated in the nucleus, acenaphthene can be hydrogenated to 1,2,3,9-tetrahydro-acenaphthene, and phenanthrene to perhydrophenanthrene or to a phenanthrene partially hydrogenated in the nucleus.

The use of ruthenium combination catalysts of this invention is valuable not only as an improvement over elemental ruthenium for the ruthenium functions of hydrogenating ketones and aldehydes, but an additional improvement is obtained in the poisoning resistance of platinum group metal catalysts. For example, a 0.6 percent by weight platinum on carbon or alumina catalyst is active for the hydrogenation of benzene rings, such as the hydrogenation of toluene at atmospheric pressure and at temperatures in the range of 150 to 250° C. Such catalysts, however, are rapidly poisoned by the thiophenes normally present in toluene. However, a catalyst consisting of 0.4 percent by weight ruthenium metal and 0.2 percent by weight platinum metal supported on carbon or alumina, has a greatly improved poisoning resistance in this reaction so that the useful catalyst life is greatly extended.

The ruthenium content of the novel catalyst of this invention may be, for example, elemental ruthenium or oxides thereof, such as the sesquioxide, dioxide and tetroxide, or salts of ruthenium such as barium perruthenite, sodium perruthenite, and the like; ruthenates such as magnesium, strontium, calcium, silver, barium, potassium and sodium ruthenates; perruthenates, such as sodium and potassium perruthenates, and the like; ruthenium halides such as ruthenium dichloride, ruthenium trichloride, ruthenium tetrachloride, ruthenium pentafluoride, and the like; ruthenium sulfides such as ruthenium disulfide; and chloro salts of ruthenium such as potassium chloro perruthenate. Of these catalytic components, elemental ruthenium and ruthenium oxides are preferred due to unusual efficacy which they possess as catalysts.

The ruthenium metal of the catalyst is promoted by another platinum group metal which is platinum, palladium or rhodium. The ruthenium content of the catalyst constitutes at least about 20 percent by weight, preferably about 20 to 95 percent by weight of the catalytically active metal content of the catalyst.

The catalyst supports which may be used in the catalyst of the invention are, for example, carbon, alumina, including activated alumina, silica, including kieselguhr and synthetic gel, titanium dioxide, calcium carbonate, barium sulfate, bentonite, and the like. The preferred supported catalysts include a catalytically active metal content in the range of about 0.1 to 10 percent by weight of the total catalyst, but catalysts having a higher active metal content can be used if desired.

The reaction temperatures for the catalytic hydrogenations of the present invention are in the range of about 0° C.–400° C. For liquid phase hydrogenations, a temperature range of about 50° C.–250° C. is preferred, while for vapor phase hydrogenations the range of about 100° C.–300° C. is preferred. The space velocity for vapor phase reactions may be in the range of about 0.1 to 500 standard volumes of gas per volume of catalysts per hour, preferably 0.5 to 50 standard volumes of gas per volume of catalyst per hour. For liquid phase batch reactions, the reaction time may be in the range of 1 minute to 2,000 minutes, preferably 5–60 minutes. The concentration of catalysts relative to the compound to be hydrogenated is in the range of 10–100,000 grams of the aromatic compound to be hydrogenated per gram of the catalyst, preferably 100–1,000 grams per gram.

The invention will be further illustrated by reference to the following specific examples:

EXAMPLE I

A large number of catalysts were prepared containing ruthenium and a platinum, palladium or rhodium promoter. The catalytically active metal was supported on a powdered carbon carrier. A preferred method for the preparation of these catalysts is as follows, which exemplifies the preparation of a catalyst consisting of 3.5 percent by weight of elemental ruthenium and 1.5 percent by weight of elemental platinum, supported on carbon powder.

Two precious metal solutions were prepared, one of which consisted of 60 ml. of potassium platinochloride ($K_2PtCl_4$). This solution contained 1 percent by weight of platinum, equivalent to 0.6 gram of platinum. A second solution was prepared by dissolving a quantity of ruthenium trichloride ($RuCl_3$), equivalent to 20.0 grams of elemental ruthenium, in 120 ml. of a 10 percent solution of hydrochloric acid without heating, and then diluting the solution with water to a quantity of 2 liters, the resulting solution being a 1 percent by weight solution of ruthenium, equivalent to 1.4 grams of elemental ruthenium. 38 grams of powdered charcoal (the latter being prepared from pine wood stumps, carbonized, and activated with air at high temperature) were suspended in 200 ml. of water in a 600 ml. beaker, and stirred for a period of 0.5 hour. The solution of potassium platinochloride and 140 ml. of the solution of ruthenium chloride were then added simultaneously, after which a 10 percent solution of sodium carbonate was added dropwise in amount of 15 ml. at a rate of 2 drops per second, and an additional 15 ml. at 0.5 drop per second. The pH of the mixture was then read on a Beckmann potentiometer as 4.80, and an additional 4 ml. of 10 percent sodium carbonate were added, raising the pH to 5.75. Superior catalysts are obtained if the pH is adjusted to the range of about 5.5 to 6.0 before heating.

The suspension was then heated above 90° C. for one hour while stirring, after which the suspension was cooled and permitted to settle. A portion of the filtered supernatant liquid had a pH of 5.35 and an $SnCl_2$ test for platinum corresponded to 3.2 percent by weight of the original quantity of platinum remaining in the filtrate. The solids were separated from the filtrate, washed, and dried at a temperature of 90° C. for a period of about 12 hours. The filtrate was clear and colorless.

The dried precipitate was broken up and a portion thereof was reduced in a hydrogen gas stream at a temperature of 400° C. for a period of 20 minutes, with nitrogen purging.

This catalyst, and others prepared in an analogous manner, were tested for activity in the hydrogenation of acetone to isopropyl alcohol at room temperature. In each of these tests, 50 mg. of a catalyst were placed in a one-liter, heavy-wall Erlenmeyer flask, and 100 ml. of distilled water were added. The flask was placed in a shaker, capped and repeatedly evacuated and filled with hydrogen gas, using the gas burette and leveling bulb method to measure hydrogen uptake. The catalyst was then prehydrogenated for a period of 15 minutes by shaking it at the rate of 260 strokes per minute and a stroke amplitude of 2.5 inches. The flask was again evacuated and then filled with air and opened. One ml. of acetone was then added, and the flask was again evacuated and filled with hydrogen. The shaker was started and the hydrogen reacted was measured on the gas burette at various intervals of time. Usually, there was a short period before reaction was initiated so that the most rapid rate of reaction occurred between 5 and 10 minutes after the start of the reaction.

In the table below are listed the results obtained, using various catalysts and following the procedure described above. All of the catalysts were supported on powdered carbon having a particle size below 50 microns. All of the results are the maximum milliliters of hydrogen reacted in a period of 5 minutes.

*Table A*

| Catalyst No. | Percent of Ru and promoter | Mls. of $H_2$ |
| --- | --- | --- |
| 1 | 5% Ru | 60 |
| 2 | 4% Ru, 1% Pd | 110 |
| 3 | 2% Ru, 3% Pd | 51 |
| 4 | 1% Ru, 4% Pd | 38 |
| 5 | 5% Pd | 0 |
| 6 | 4.5% Ru, 0.5% Pt | 116 |
| 7 | 4% Ru, 1% Pt | 129 |
| 8 | 4% Ru, 0.5% Pt, 0.5% Pd | 123 |
| 9 | 3.5% Ru, 1.5% Pt | 134 |
| 10 | 3.5% Ru, 1% Pt, 0.5% Pd | 133 |
| 11 | 2% Ru, 3% Pt | 96 |
| 12 | 3.5% Ru, 1.5% Rh | 99 |
| 13 | 5% Rh | 17 |

On the basis of these results, it will be noted that the initial activity of the catalyst consisting of 5 percent by weight of elemental ruthenium, supported on carbon, is strongly modified by the substitution of platinum, rhodium or palladium for a portion of the elemental ruthenium. The promotion of the ruthenium metal with one of these other platinum group metals may increase the activity of the catalyst to as much as twice that of the elemental ruthenium catalyst alone.

The ruthenium-platinum and ruthenium-palladium catalysts were also found to be much superior to the elemental ruthenium catalyst in stability of activity. For example, catalysts No. 1 above, when tested three days after the run was made in which a hydrogen uptake of 60 ml. in 5 minutes was observed, reacted with only 5 ml. of hydrogen. However, after being reduced again, the activity of the catalyst was restored so that 62 ml. of hydrogen were taken up when the run was repeated. In other cases, however, elemental ruthenium catalysts which had shown loss of activity upon standing, were unrestored by being again reduced.

In contrasts to this, catalyst No. 10 above was retested several years later without being reduced prior to test.

The original activity of the catalyst was decreased from 133 ml. of hydrogen taken up, to about 56 ml. of hydrogen taken up so that the catalyst still retained an activity nearly equivalent to that of the fresh elemental ruthenium catalyst.

EXAMPLE II

Other materials than carbon were tested for use as catalyst supports and among these were titanium dioxide having a particle size in the range of about 7 to 20 microns, titanium dioxide having a sub-micron particle size, kieselguhr, barium sulfate, calcium carbonate and activated alumina.

Preparation of catalysts using the aforementioned supports was effected using methods analogous to that described for the preparation of the catalyst of Example I. However, there was a slight variation in the preferred conditions for the reduction of the precipitated mixed hydrates of ruthenium and promoter metals, depending upon the carrier employed.

In the case of a calcium carbonate carrier, and other carriers attacked by the acidity of the ruthenium chloride, a modification of the coating procedure is desirable. A preferred procedure using such carriers is as follows:

38 grams of calcium carbonate were suspended in 200 ml. of water in a 600 ml. beaker while stirring, and 80 ml. of potassium platinochloride solution, containing 0.8 gram of platinum and having a pH of about 4, were added at once to the suspension. Some bubble formation occurred after this addition; the pH of the suspension was then 7.1. 120 ml. of a solution of ruthenium chloride, prepared in accordance with the procedure disclosed in Example I above and containing 1.2 grams of ruthenium, was added dropwise while bubble formation occurred as a result of the reaction of calcium carbonate releasing carbon dioxide. After the ruthenium chloride solution was completely added, the pH was 5.58 so that no pH adjustment was required before heating. The suspension was then heated to a temperature of 90° C. for a period of two hours while stirring, and it was then allowed to settle. A portion of the filtered supernatant liquid has a pH of 7.3, and a platinum test corresponding to 12 percent by weight of the original quantity of platinum undeposited. The precipitate was washed and dried at a temperature of 90° C. for several days. The filtrate was faintly colored. The dry solids were broken up and one portion thereof was reduced at a temperature of 230° C. with hydrogen for a period of 20 minutes while purging with nitrogen.

A second portion of the solids was further dried overnight at a temperature of 175° C., and 10 grams thereof were suspended while stirring in 150 ml. of water in a 250 ml. beaker. To this suspension was added 1.0 ml. of 88 percent formic acid, and the suspension was heated at a temperature of 90° C. for a period of one hour and was then permitted to cool and settle. A portion of the filtered supernatant liquid had a pH of about 6, and a platinum test indicated about 3.5 percent by weight of the original quantity of platinum redissolved. The precipitate was washed and dried at a temperature of about 90° C. The filtrate had a deep yellow color, indicating that some ruthenium also was redissolved.

The first portion of the solids, as described above, is catalyst No. 1 in the table below, while the second portion is catalyst No. 2 in the table below. Activity tests of these catalysts were compared, together with catalysts having different supports but prepared in an analogous fashion. In each case, a 2.5 mg. total of catalytically active metal was employed, e.g., 50 mg. of catalyst containing 5 percent by weight of catalytically active metal, or 250 mg. of catalyst containing 1 percent by weight of catalytically active metal.

Following the procedure described in Example I above, 1 ml. of acetone was hydrogenated in the presence of 100 ml. of water in each case. In the results below, hydrogen absorption or reaction rates are listed for the most active preparation made of each catalyst type.

Table B

| Catalyst No. | Percent of Ru and promoter | Carrier | Mls. of $H_2$ |
| --- | --- | --- | --- |
| 1 | 3% Ru, 2% Pt | $CaCO_3$ | 71 |
| 2 | 3% Ru, 2% Pt | $CaCO_3$ | 67 |
| 3 | 3.5% Ru, 1% Pt, 0.5% Pd. | $CaCO_3$ | 64 |
| 4 | 4% Ru, 1% Pd | $CaCO_3$ | 63 |
| 5 | 5% Ru | $CaCO_3$ | 36 |
| 6 | 1.2% Ru, 0.8 Pd | $CaCO_3$ | 88 |
| 7 | 0.7% Ru, 0.3% Pt | $CaCO_3$ | 113 |
| 8 | 4% Ru, 1% Pd | $TiO_2$(TG) | 18 |
| 9 | 1.6% Ru, 0.4% Pd | $TiO_2$(TG) | 28 |
| 10 | 0.4% Ru, 0.1% Pd | $TiO_2$(TG) | 73 |
| 11 | 0.08% Ru, 0.02% Pd | $TiO_2$(TG) | 111 |
| 12 | 4% Ru, 1% Pd | $TiO_2$(AMO) | 65 |
| 13 | 4% Ru, 1% Pd | Kieselguhr | 75 |
| 14 | 4% Ru, 1% Pd | $BaSO_4$ | 23 |
| 15 | 3.5% Ru, 1.5% Pt | Alumina | 30 |
| 16 | 3.5% Ru, 1.5% Pt | Same, except base digested HCl. | 56 |

The foregoing results show that low surface carriers, such as titanium dioxide (technical grade) and calcium carbonate have greatly increased activity per unit weight of precious metal when the percentage of metal in the catalyst is decreased below 5 percent by weight because of wider dispersion of the metal. This does not occur when using high surface carriers, such as carbon, for example, upon reduction of the metal content below 5 percent by weight. If the activity of the catalyst is compared on the basis of volume rather than weight, the titanium dioxide TG carrier which has density 5 or 6 times that of the powdered carbon used, compares more favorably with the same weight of metal on the same volume of carbon.

EXAMPLE III

Preferred methods of mixing carriers with metal salts, and the hydrolysis thereof, are described in the preceding examples. Reduction of the catalyst powders was examined in hydrogen gas streams at various temperatures, also by heating of wet suspension with formic acid or alkaline formate solutions, and by combinations of wet and dry reductions.

Generally speaking, wet reductions were ineffective for the treatment of elemental ruthenium catalysts, but had some effect upon metal combinations. The dry reduction preparations were generally more active, however. In a few cases, wet followed by dry reduction gave the most active catalysts with metal combinations, but such results were not consistently achieved. In certain cases of reduction of catalysts in hydrogen gas streams, a preheating of the catalysts to the reduction temperature in a nitrogen gas stream resulted in more active catalysts.

An impressive fact about the reduction of ruthenium or ruthenium and metal promoters, using hydrogen gas, is that the preferred reduction temperature is specific for each carrier, this not being easily explained although sintering effects are probably a factor. The preferred reduction temperature may be as low as 75 or as high as 550° C.

The preferred reduction temperatures are the highest using carbon carriers, including activated carbon powder from pine wood stumps, these temperatures generally being in the range of 500°–550° C. for a catalyst consisting of 5 percent by weight elemental ruthenium on carbon, and about 450° C. for elemental ruthenium in combination with a promoter metal. For other carbon carriers, the preferred reduction temperature may be as low as about 200° C. Catalysts using alumina and titanium dioxide are most active when reduced at a temperature of about 250° C., while those using calcium carbonate, barium sulfate and silica gel as carriers are most active when reduced at a temperature of about 200° C. Catalysts using kieselguhr as a carrier were most active when reduced at a temperature in the range of 75°–125° C.

EXAMPLE IV

At temperatures in the range of 150°–260° C. with a one atmosphere gas phase flow system and granular catalysts, platinum, on either carbon or alumina, is superior to rhodium for the hydrogenation of toluene using the same carriers. Palladium on alumina has been found to be superior to rhodium on alumina and, under the same conditions, ruthenium catalysts were found to be much inferior to those of platinum, palladium or rhodium, and approximately equivalent to nickel catalysts.

The active platinum catalysts, however, were found to be very susceptible to poisoning by the thiophenes which are present even in reagent grade toluene. It was discovered that substitution of ruthenium for about ⅔ of the platinum, produced catalysts, both on extruded alumina and granular carbon supports, which resisted poisoning to a greater degree.

Comparison toluene hydrogenations were effected in a Pyrex reactor, using 18.4 grams of catalyst in a bed 2.5 inches deep. The initial temperature was maintained at 200° C. by an agitated oil bath. A mixture consisting of 9 moles of hydrogen and 1 mole of toluene was passed over the catalyst at a pressure of 1 atmosphere and a weight hourly space velocity of 2.

About 40 ml. of reagent grade toluene was passed over the catalyst in slightly less than one hour. The product was collected in a solid carbon dioxide and methanol trap and assayed for percent methylcyclohexane-percent toluene against standards by means of refractive index. After purging the catalyst and exposing it to air, it was replaced in the reactor and used in a run of 4.5 hours under the same conditions using a more impure toluene, the same lot being used for each comparative run. Samples were collected for refractive index measurement during the beginning, middle and last half hour of the 4.5 hour period, i.e., based on the total test, 1 to 1.5 hours; 3 to 3.5 hours; and 5 to 5.5 hours.

Percent conversion to methylcyclohexane is shown for each of the four test samples of specified catalysts. The carbon carrier used was cocoanut carbon having a particle size in the range of 4 to 8 mesh. The activated alumina used was 1/16 inch extrudate. The metals were deposited on the exterior surface of the granular carbon, while in the case of alumina, they were deposited by gel impregnation prior to the formation of pellets.

The results are as follows:

Table C

| Catalyst composition | Percent conversion to methylcyclohexane | | | |
|---|---|---|---|---|
| | 0 to 1 hrs. | 0 to 1.5 hrs. | 3 to 3.5 hrs. | 5 to 5.5 hrs. |
| 0.6% Pt on C | 76 | 65 | 1 | 0 |
| 0.4% Ru, 0.2% Pt on C | 68 | 58 | 25 | 0 |
| 0.6% Pt on Alumina | 74 | 44 | 7 | 0 |
| 0.4% Ru, 0.2% Pt on Alumina | 59 | 55 | 30 | 15 |

It is apparent from the table that substitution of ruthenium for two-thirds of the normal platinum content increased the active life of the catalyst in this reaction.

EXAMPLE V

A number of experimental runs were made on hydrogenation of p-xylene with separately unpromoted ruthenium and unpromoted platinum group metals other than ruthenium as catalyst and also with ruthenium catalysts promoted with another platinum group metal in accordance with this invention. 300 mg. of catalyst was utilized for each run. The hydrogenation was carried out by bubbling the hydrogen through the p-xylene in liquid phase and in the presence or absence of a diluent at a temperature of 100° C. and a pressure of 1000 p.s.i.g. while stirring the p-xylene at a rate of 800 r.p.m. The results obtained are set forth in Table D below:

Table D

Comparison of Xylene Hydrogenation Rates

| Expt. No. | Catalyst | Ml. p-xylene | Ml. $H_2O$ diluent | Rate, ml. $H_2$/min. |
|---|---|---|---|---|
| 1 | 5% Ru/C | 25 | 25 | 815 |
| 2 | 5% Ru/C | 25 | 25 | 654 |
| 3 | 5% Ru/C | 50 | None | 743 |
| 4 | 5% Rh/C | 25 | 25 | 755 |
| 5 | 2.5% Rh, 2.5% Ru/C | 25 | None | 7,800 |
| 6 | 2.5% Rh, 2.5% Ru/C | 25 | 25 | 906 |
| 7 | 4.0% Rh, 1.0% Ru/C | 25 | None | 933 |
| 8 | 4.0% Rh, 1.0% Ru/C | 25 | 25 | 847 |

The data of Table D evidences the synergistic improvement in the hydrogenation rate attained in the hydrogenation of p-xylene with the ruthenium catalyst promoted with another platinum group metal over an unpromoted ruthenium catalyst. Experiment No. 5 in particular shows a very outstanding synergistic improvement in the hydrogenation rate utilizing a 2.5% Ru 2.5% Ru/C catalyst in the absence of a diluent.

Catalysts, prepared in accordance with this invention, which contain a relatively low proportion of ruthenium in relation to the promoter metal and which are effecacious for the reduction of certain sugars, are disclosed in copending application Serial No. 702,271, filed December 12, 1957.

It will be obvious to those skilled in the art that many modifications may be made within the scope of the present invention without departing from the spirit thereof, and the invention includes all such modifications.

What is claimed is:

1. A process for the nuclear hydrogenation of a carbocyclic aromatic compound of the group consisting of unsubstituted carbocyclic aromatic compounds and nuclear substitution derivatives thereof wherein the substituent is an alkyl radical, which comprises contacting the compound in the presence of hydrogen with a supported ruthenium-containing catalyst also containing as promoter a material selected from the group consisting of platinum, rhodium and palladium, the ruthenium content of the catalyst being at least about 20 percent by weight of the catalytically active metal content of the catalyst.

2. A process according to claim 1, in which the ruthenium content of the catalyst is selected from the group consisting of elemental ruthenium and ruthenium oxide.

3. A process according to claim 1, in which the carboruthenium content of the catalyst is between about 20 and 95 percent by weight of the catalytically active metal content of the catalyst.

4. A process according to claim 1, in which the carbocyclic aromatic compound is benzene.

5. A process according to claim 1, in which the carbocyclic aromatic compound in toluene.

6. A process according to claim 1, in which the carbocyclic aromatic compound in naphthalene.

7. A process according to claim 1 in which the carbocyclic aromatic compound is a xylene.

8. A process according to claim 1, in which the carbocylic aromatic compound is anthracene.

9. A process according to claim 1 wherein the catalytic contacting is effected at a temperature in the range of about 0° C.–400° C.

10. A process according to claim 1 wherein the catalytic contacting is effected with the carbocyclic aromatic compound in vapor phase and at a temperature of about 100° C.–300° C.

11. A process according to claim 1 wherein the catalytic contacting is effected with the carbocyclic aromatic compound in liquid phase and at a temperature of about 50° C.–250° C.

References Cited by the Examiner
UNITED STATES PATENTS

| | | | |
|---|---|---|---|
| 2,868,847 | 1/59 | Boyers | 252—472 |
| 2,911,357 | 11/59 | Myers et al. | 252—466 |
| 2,927,141 | 3/60 | Cohen et al. | 260—677 |

OTHER REFERENCES

"Advances in Catalysis," volume IX; 1957; pages 716–726; QD 501 A3; Academic Press., Inc., N.Y.C., N.Y.

ALPHONSO D. SULLIVAN, *Primary Examiner.*

UNITED STATES PATENT OFFICE
CERTIFICATE OF CORRECTION

Patent No. 3,183,278                                        May 11, 1965

John H. Koch, Jr.

It is hereby certified that error appears in the above numbered patent requiring correction and that the said Letters Patent should read as corrected below.

In the grant, line 1, and in the heading to the printed specification, line 4, name of inventor, for "John J. Koch, Jr.", each occurrence, read -- John H. Koch, Jr. --; column 1, line 15, for "3,055,084" read -- 3,055,840 --; column 8, line 53, for "platium" read -- platinum --; line 61, strike out "carbo-".

Signed and sealed this 21st day of September 1965.

(SEAL)
Attest:

ERNEST W. SWIDER                                       EDWARD J. BRENNER
Attesting Officer                                          Commissioner of Patents